US 7,949,834 B2

(12) United States Patent
Morrow

(10) Patent No.: US 7,949,834 B2
(45) Date of Patent: May 24, 2011

(54) METHOD AND APPARATUS FOR SETTING CACHE POLICIES IN A PROCESSOR

(75) Inventor: Michael William Morrow, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 11/626,434

(22) Filed: Jan. 24, 2007

(65) Prior Publication Data

US 2008/0177952 A1 Jul. 24, 2008

(51) Int. Cl.
 *G06F 12/00* (2006.01)
(52) U.S. Cl. .......................... 711/144; 711/134; 711/145
(58) Field of Classification Search .................. 711/144, 711/145, 134
 See application file for complete search history.

(56) References Cited

U.S. PATENT DOCUMENTS

| | | | | |
|---|---|---|---|---|
| 5,325,504 A | * | 6/1994 | Tipley et al. | 711/128 |
| 5,751,996 A | * | 5/1998 | Glew et al. | 711/145 |
| 5,860,114 A | * | 1/1999 | Sell | 711/146 |
| 6,434,669 B1 | | 8/2002 | Arimilli | |
| 6,891,543 B2 | * | 5/2005 | Wyatt | 345/541 |
| 7,401,358 B1 | * | 7/2008 | Christie et al. | 726/21 |
| 2003/0159020 A1 | * | 8/2003 | Henry et al. | 712/209 |
| 2004/0034746 A1 | * | 2/2004 | Horn et al. | 711/141 |
| 2004/0215893 A1 | | 10/2004 | Emerson | |
| 2006/0143405 A1 | * | 6/2006 | Ishikawa et al. | 711/141 |
| 2006/0179259 A1 | * | 8/2006 | Kershaw et al. | 711/154 |
| 2006/0288170 A1 | * | 12/2006 | Varma et al. | 711/122 |
| 2007/0126756 A1 | * | 6/2007 | Glasco et al. | 345/620 |

OTHER PUBLICATIONS

International Search Report—PCT/US08/051953, International Search Authority—European Patent Office—Jun. 20, 2008.
Written Opinion—PCT/US08/051953, International Search Authority—European Patent Office—Jun. 20, 2008.

* cited by examiner

*Primary Examiner* — Hashem Farrokh
(74) *Attorney, Agent, or Firm* — Peter M. Kamarchik; Nicholas J. Pauley; Jonathan T. Velasco

(57) ABSTRACT

According to the methods and apparatus taught herein, processor caching policies are determined using cache policy information associated with a target memory device accessed during a memory operation. According to one embodiment of a processor, the processor comprises at least one cache and a memory management unit. The at least one cache is configured to store information local to the processor. The memory management unit is configured to set one or more cache policies for the at least one cache. The memory management unit sets the one or more cache policies based on cache policy information associated with one or more target memory devices configured to store information used by the processor.

23 Claims, 7 Drawing Sheets

US 7,949,834 B2

METHOD AND APPARATUS FOR SETTING CACHE POLICIES IN A PROCESSOR

BACKGROUND

1. Field of the Invention

The present invention generally relates to caching operations in a processor, and particularly relates to determining cache policies.

2. Relevant Background

Processor performance is improved by including one or more levels of cache locally in a processor for storing frequently accessed or most recently used information. A processor cache is a small, fast memory which stores a copy of select information stored in main memory such as DRAM or a hard-disk drive. When an instruction accesses a memory location, the processor first checks whether the memory location is replicated in a local cache. Particularly, the address associated with the memory access is compared to all tags in a cache. If the desired memory is located in the cache, a cache hit occurs. Otherwise, a cache miss occurs.

When a cache hit occurs, the processor immediately reads or writes the information such as data or instructions in the identified cache line. In the event of a cache miss, the desired information is retrieved from a higher-level cache or main memory. Also, a new entry is conventionally allocated in the cache to store the newly retrieved information. The new entry comprises a tag identifying the address that caused the cache miss and a copy of the information retrieved from main memory.

To accommodate a new cache entry, an existing entry is evicted from the cache. The heuristic used to choose the entry to evict from a cache is based on a replacement policy such as least recently used or first-in, first-out. Other cache policies (also referred to as cache attributes) are also utilized to determine how a cache is accessed, used and maintained. Other cache policies include write policies, allocation policies, cache level policies, and customized policies.

Write policies determine when information written to a cache block is also written to main memory. For example, cache and main memory are updated at the same time when a write-through policy is used. When a write-back policy is employed, main memory is updated only when the corresponding cache block is replaced. A write-once policy uses a write-through policy for the first write to a particular cache block and a write-back policy for subsequent writes to the same block.

A cache allocation policy determines when a cache block is written. For example, if the allocation policy associated with a particular cache block is "allocate on read only", the block is not disturbed during writes. To the contrary, the cache block is updated during both writes and reads when the allocation policy is "allocate on read and write". For processors having multiple levels of caches such as first-level instruction and data caches and at least one higher level cache, a cache level policy determines which level of cache is used to store information. For example, instructions may be stored in a first-level instruction cache while other information may be stored only in a second level cache.

Cache policies are conventionally stored in a page table. The page table is maintained in main memory with frequently accessed or most recently used entries being stored locally to a processor, e.g., in a Translation Lookaside Buffer (TLB). Each page table entry maps a virtual address to a corresponding physical address. Particularly, a page table stores a list of virtual page numbers and corresponding physical page numbers. The virtual page numbers identify respective blocks of virtual memory allocated to processes running on a processor while the physical page numbers identify the corresponding blocks of physical memory containing the actual information used by the processes.

When a processor accesses a particular memory location, page table entries are searched using the virtual page number portion of the virtual address provided as part of the access. The physical page number is retrieved from the matching page table entry. The physical page number and page offset form a physical address which is used to access the desired memory location.

If the desired memory location is not contained within a local processor cache, main memory is accessed. Cache policy information stored in the matching page table entry determines whether information read from or written to main memory as part of the memory access is stored locally in the cache, and if so, how the information is maintained in the cache. Thus, cache policies are conventionally set and applied to a cache on a per-page (or per block) basis. Further, cache policies are conventionally programmed by the operating system. As such, cache policies are applied generally to all processes running on a processor and may result in inefficiencies when utilized by a particular type of main memory device. For example, an "allocate on read only" cache allocation policy may optimize cache utilization for some processes such as graphics applications, but not others.

SUMMARY OF THE DISCLOSURE

According to the methods and apparatus taught herein, processor caching policies are determined using cache policy information associated with a target memory device accessed during a particular memory operation. Thus, caching operations may be tailored to particular memory device settings instead of general cache policy settings. Processor performance is improved by determining cache policies for a current memory operation based on cache policy information associated with the target memory device accessed during the memory operation.

According to one embodiment of a processor, the processor comprises at least one cache and a memory management unit. The at least one cache is configured to store information local to the processor. The memory management unit is configured to set one or more cache policies for the at least one cache. The memory management unit sets the one or more cache policies based on cache policy information associated with one or more target memory devices configured to store information used by the processor.

According to one embodiment of a system, the system comprises a processor having at least one cache configured to store information local to the processor, one or more target memory devices coupled to the processor and a memory management unit included in the processor. The one or more target memory devices are configured to store information used by the processor. The memory management unit is configured to set one or more cache policies for the at least one cache based on cache policy information associated with the one or more target memory devices.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
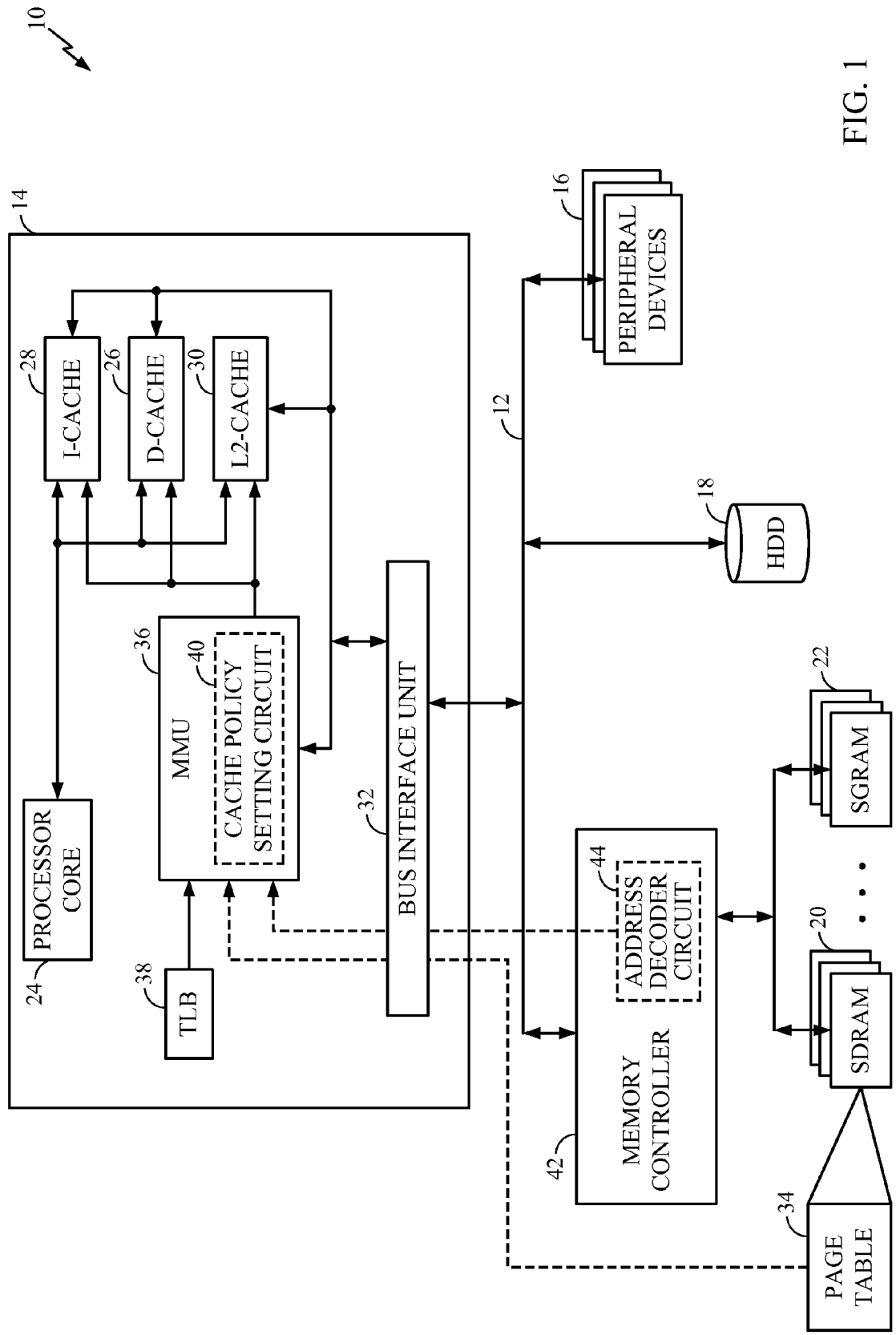
FIG. 1 is a block diagram illustrating an embodiment of a system including a processor having circuitry for determining cache policies.

FIG. 1 illustrates an embodiment of a system 10 including a bus 12 coupling a processor 14 to one or more peripheral devices 16 and main memory such as a hard-disk drive (HDD) 18 and DRAM such as Synchronous DRAM (SDRAM) 20 and Synchronous Graphics RAM (SGRAM) 22. The processor 14 includes a processor core 24, data and instruction caches 26, 28, a second-level cache (L2) 30 and a bus interface unit 32. The processor core 24 provides centralized control of instruction flow and instruction execution. The data and instruction caches 26, 28 store data and instructions, respectively. The L2 cache 30 provides a high-speed memory buffer between the data and instruction caches 26, 28 and main memory external to the processor 14 such as the HDD 18, SDRAM 20, and SGRAM 22. The bus interface unit 32 provides a mechanism for transferring data, instructions, addresses, and control signals between the processor 14 and devices external to the processor 14 such as peripherals 16 and main memory 18, 20, 22.

Main memory 18, 20, 22 is represented as virtual memory to processes running on the processor 14. That is, pages of physical memory are allocated as virtual memory for use by processes during program execution. A page table 34 is maintained in main memory 18, 20, 22, e.g., as shown in FIG. 1, for enabling mapping between virtual and physical address spaces. A Memory Management Unit (MMU) 36 included in the processor 14 accesses the page table 34 and handles memory accesses issued by the processor 14, including virtual memory management, memory protection, cache control, and bus arbitration. As part of virtual memory management, the MMU 36 maintains frequently or recently referenced page table entries (PTEs) local to the processor 14, e.g., in a Translation Lookaside Buffer (TLB) 38.

When the processor 14 accesses a desired memory location identified by a virtual address, the MMU 36 accesses the TLB 38 to determine whether the TLB 38 contains a matching entry. If so, the virtual address is translated into a physical address using address translation information stored in the matching TLB entry. Otherwise, the page table 34 is searched for a matching entry. Either way, the MMU 36 initiates a cache lookup operation in one of the physically-tagged caches 26, 28, 30 based on the resulting physical address. If one of the caches 26, 28, 30 contains the desired memory location, the corresponding cache line is accessed and the memory access completes, e.g., by reading from or writing to the cache line. Otherwise, the MMU 36 initiates a memory access to main memory 18, 20, 22 for accessing the desired memory location.

Main memory 18, 20, 22 is accessed by providing the physical address which identifies the desired memory location. The memory device containing the desired memory location is referred to herein as the target memory device. According to the various embodiments disclosed herein, the target memory device may comprise any addressable memory module, device or bank included in the system. For example, a target memory device may be one of the SDRAMs 20, SGRAMs 22 or other memory device (not shown) depending on the particular process being executed by the processor 14.

In response to an external memory access, cache policy information associated with the corresponding target memory device is provided to a cache policy setting circuit 40 included in or associated with the MMU 36. The cache policy setting circuit 40 determines the cache policy settings for the current memory operation based on the cache policy information associated with the corresponding target memory device. This way, when the processor 14 accesses a particular external memory location, cache policies are tailored to the corresponding target memory device containing the desired memory location.

For example, if a memory operation is directed to one of the SGRAM devices 22, the cache allocation policy associated with the target SGRAM device may be "allocate on read only" when the target device functions as a video frame buffer for a multimedia application. The processor 14 may write frequently to the target SGRAM device during execution of a multimedia application, but rarely read from the device. Thus, the target SGRAM device's cache allocation policy may indicate "allocate on read only" for improving processor performance. The target memory device's cache policy information may also indicate a particular replacement policy, write policy, allocation policy, cache level policy, and/or one or more customized policies.

In one embodiment, cache policy information associated with a target memory device is provided by a memory controller 42 that provides an interface between the bus 12 and the various DRAM devices 20, 22 as shown in FIG. 1. According to this embodiment, the memory controller 42 includes an address decoder circuit 44 for decoding physical memory addresses provided by the processor 14 as part of memory accesses (e.g., reads or writes). The cache policy information generated by the address decoder circuit 44 is a function of the physical memory address provided as part of a particular memory access. The physical address identifies the memory device containing the memory location which is the target of the current memory operation.

Figure 2:
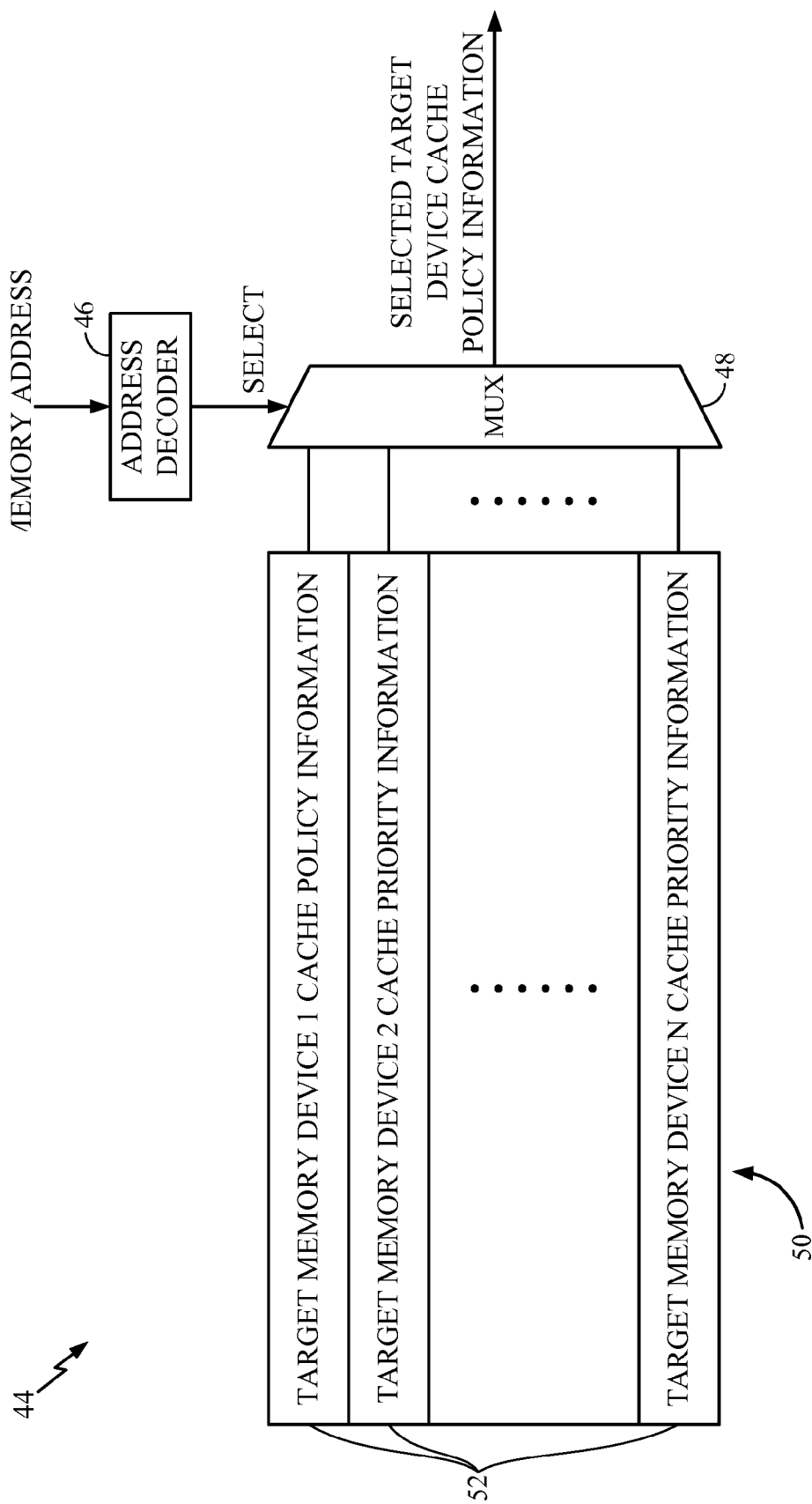
FIG. 2 is a block diagram illustrating an embodiment of an address decoder circuit for providing cache policy information associated with a memory device.

FIG. 2 illustrates one embodiment of the address decoder circuit 44. According to this embodiment, the decoder circuit 44 includes an address decoder 46, a multiplexer 48 and a table 50 having various entries 52 associated with respective memory devices 20, 22 supported by the memory controller 42. Each table entry 52 contains cache policy information associated with a corresponding memory device.

When the processor 14 accesses external memory, the physical address included as part of the access identifies one of the memory devices 20, 22 supported by the memory controller 42. The address decoder 46 decodes the physical address, causing the multiplexer 48 to select the entry 52 containing the cache policy information associated with the target memory device identified by the physical address. The memory controller 42 provides the selected cache policy information to the MMU 36 via the bus 12 and the bus interface unit 32 (e.g., as shown by the dashed line going from the address decoder circuit 44 to the MMU 36 in FIG. 1). The cache policy setting circuit 40 uses the received cache policy information to set the cache polices for the current memory operation. This way, cache policies may be set on a per-cache line basis as a function of target memory device.

Figure 3:
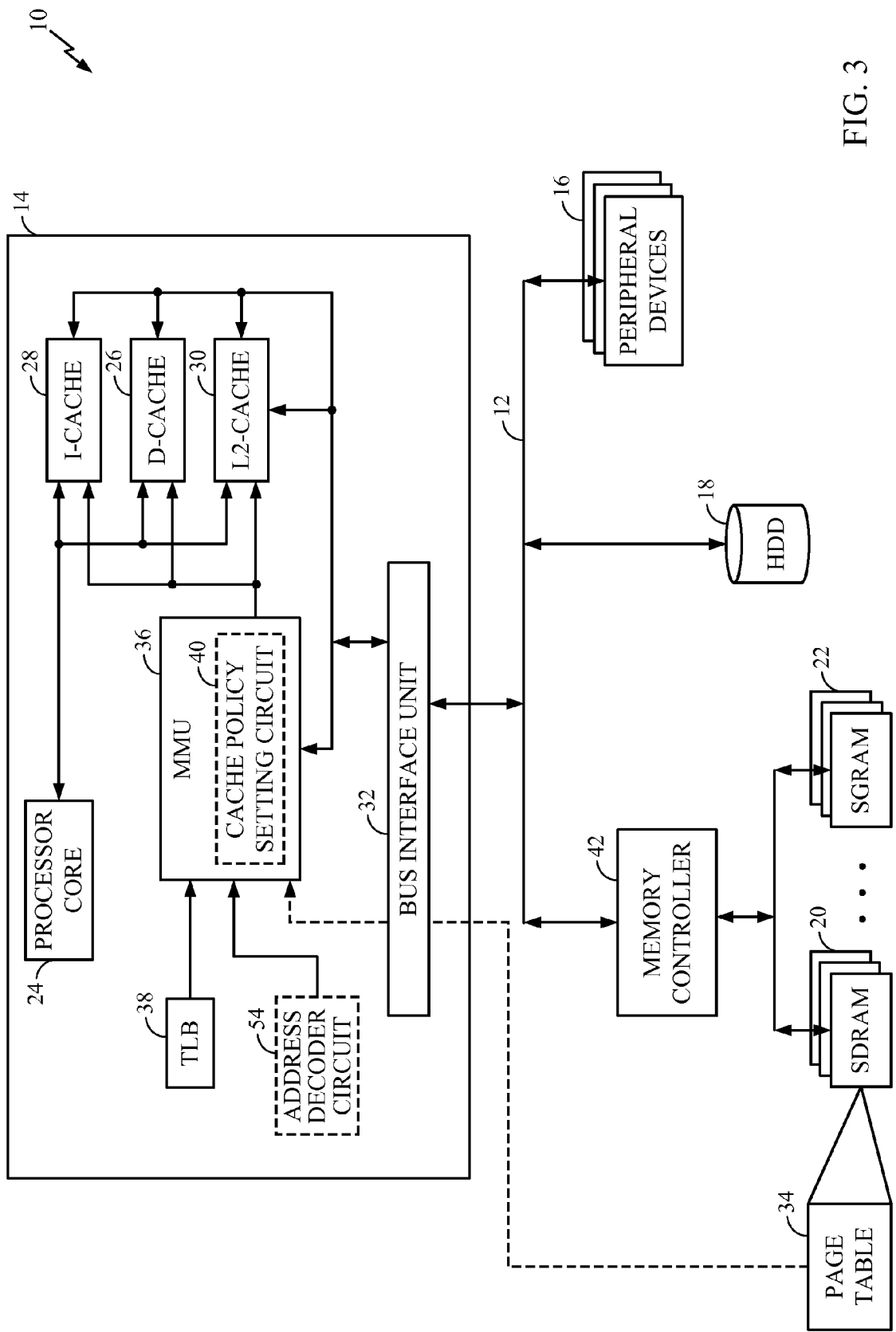
FIG. 3 is a block diagram illustrating another embodiment of a system including a processor having circuitry for determining cache policies.

In another embodiment, cache policy information is provided by an address decoder circuit 54 included in the processor 14 as shown in FIG. 3. According to this embodiment, the address decoder circuit 54 provides cache policy information based on virtual addresses or physical addresses, e.g., as previously described and in accordance with FIG. 2. In yet another embodiment, one or more of the memory devices 20, 22 supported by the memory controller 42 store their cache policy information, e.g., in a device ID register or other register (not shown). When a target memory device is accessed by the memory controller 42, cache policy information is provided to the controller 42 and forwarded to the processor 14 as previously described. Alternatively, the cache policy information is provided to the processor 14 without solicitation, e.g., automatically during system boot or upon reset of the processor 14. Further, the processor 14 may store the tailored cache policy information upon receipt, thus obviating the need to request the same information when the corresponding target memory device is subsequently accessed. Instead, the processor 14 internally retrieves and uses the tailored cache policy information. Regardless, the cache policy setting circuit 40 uses target memory device cache policy information to set cache policies during memory operations.

Figure 4:
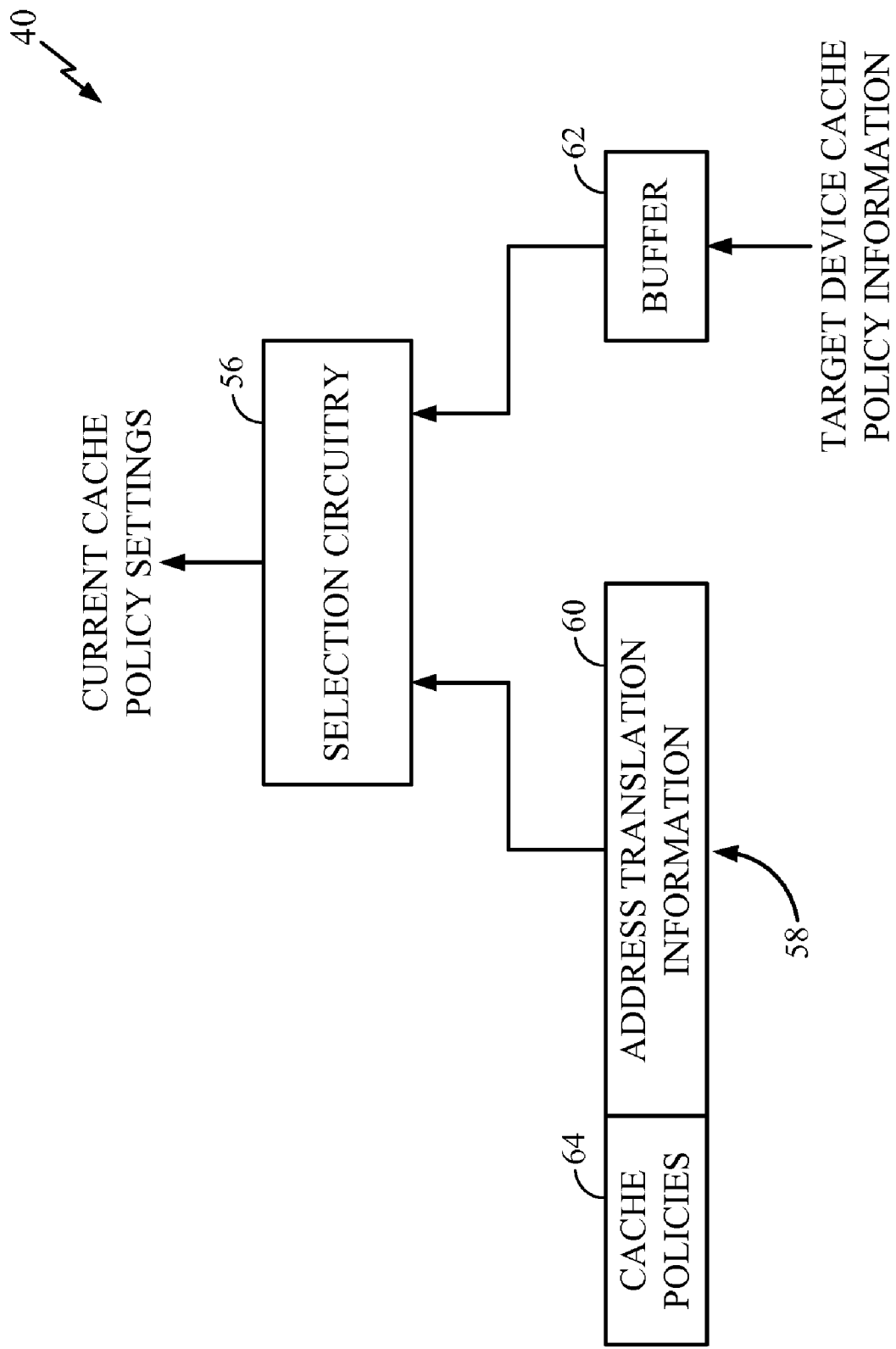
FIG. 4 is a block diagram illustrating an embodiment of circuitry for determining cache policies in a processor.

FIG. 4 illustrates an embodiment of the cache policy setting circuit 40 included in or associated with the MMU 36. According to this embodiment, the cache policy setting circuit 40 includes selection circuitry 56 for setting cache policies directed to a current memory operation. In more detail, a page table entry (PTE) 58 matching the virtual address provided as part of a memory access is retrieved from either the TLB 38 or page table 34 (e.g., as shown by the dashed line going from the page table 34 to the MMU 36 in FIG. 1). The virtual address is translated into a corresponding physical address based on address translation information 60 stored in the matching PTE 58 where the physical address identifies the desired memory location.

If the desired memory location is not located in one of the processor caches 26, 28, 30, the MMU 36 initiates an external memory access. In response to the request, the memory controller 42 identifies the target memory device containing the desired memory location based on the translated physical address. The processor 14 gains access to the target memory device via the memory controller 42. The target memory device performs the desired memory operation (e.g., a read or write). In addition, cache policy information associated with the target memory device is provided to the cache policy setting circuit 40 and stored in a buffer 62 as part of the memory operation, e.g., as illustrated by Step 100 of FIG. 5.

Figure 5:
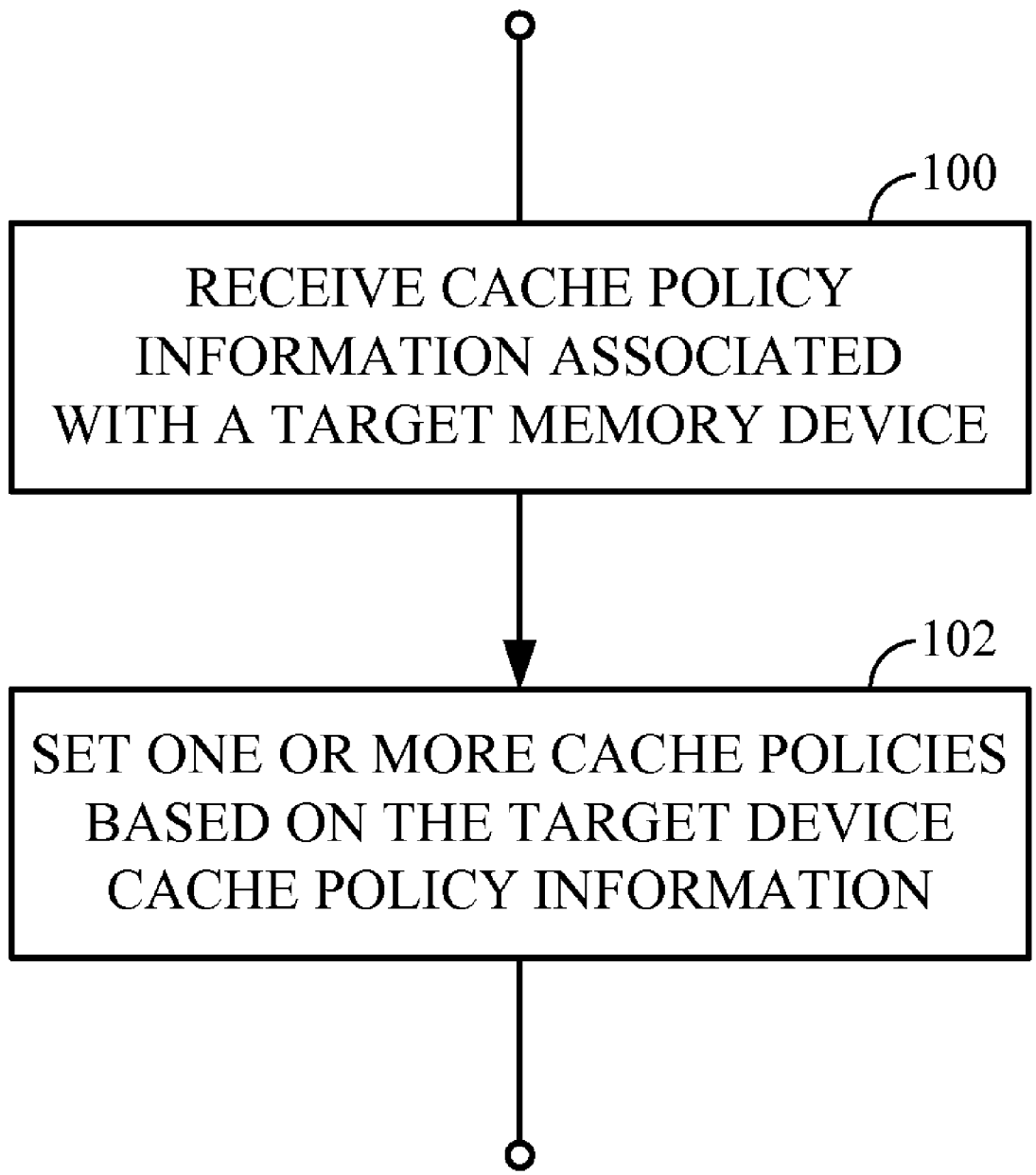
FIG. 5 is a logic flow diagram illustrating an embodiment of program logic for determining cache policies in a processor.

The selection circuitry 56 processes cache policy information 64 retrieved from the matching PTE 58 and the target memory device's cache policy information stored in buffer 62, e.g., as illustrated by Step 102 of FIG. 5. The cache policy information 64 retrieved from the matching PTE 58 is overwritten with the target device's information and used as the current cache policy settings. However, if no cache policy information is provided for the target memory device, the cache policy information 64 retrieved from the matching PTE 58 is used instead.

Figure 6:
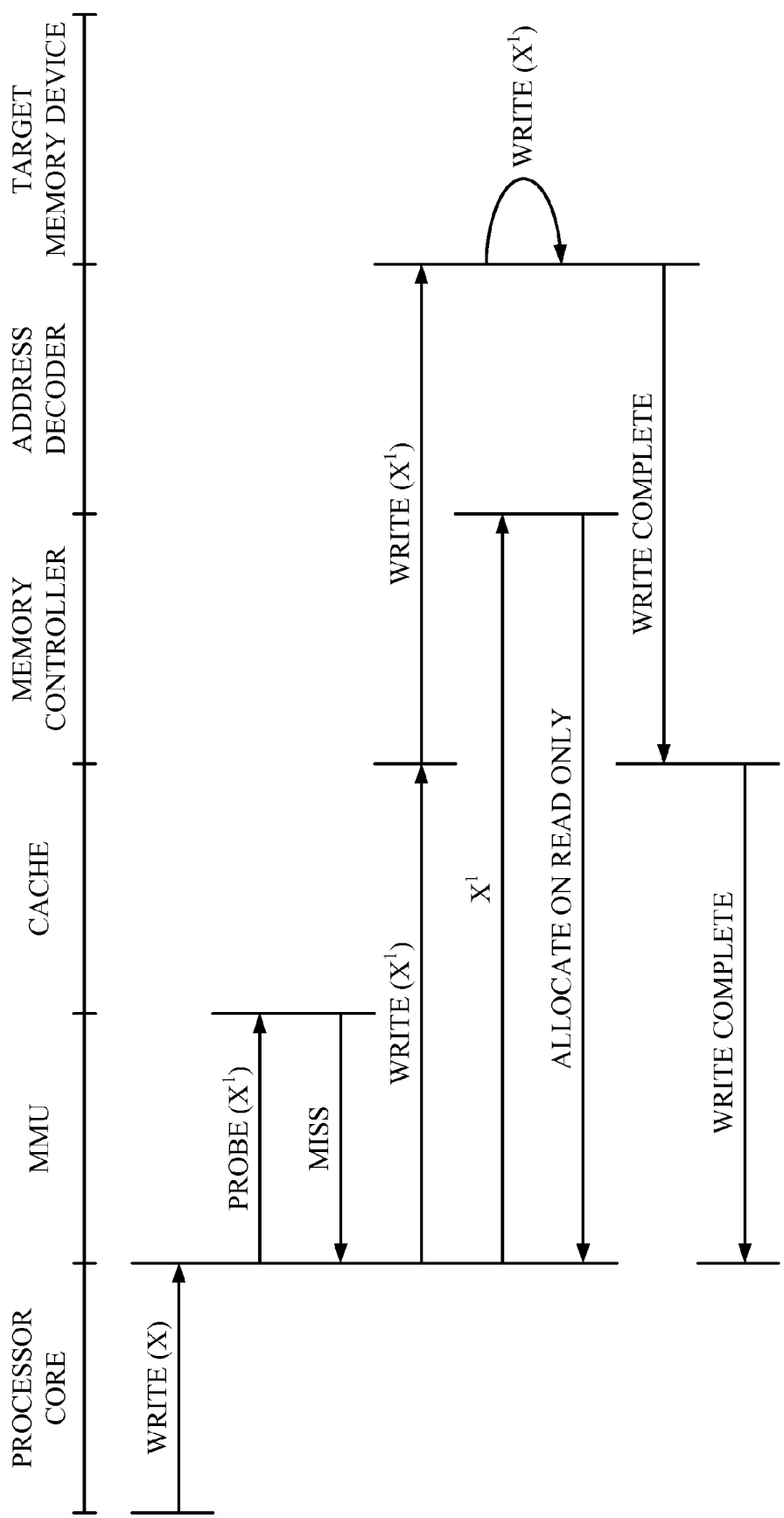
FIG. 6 is a diagram illustrating how the circuitry of FIG. 4 determines caching policies responsive to an exemplary write operation.

A purely illustrative example of how the cache policy setting circuit 40 determines caching policies is illustrated in FIG. 6. The processor core 24 issues a memory write request to virtual address X. The MMU 36 retrieves the matching PTE from either the TLB 38 or page table 34 and uses it to convert virtual address X to a corresponding physical address X'. The MMU 36 then probes one or more of the physically-tagged caches 26, 28, 30 using physical address X'. In this example, none of the caches 26, 28, 30 contains the desired memory location as indicated by a cache miss. Accordingly, the MMU 36 issues an external memory write request to the memory controller 42 based on physical address X'. The memory controller 42 selects the target memory device containing the memory location identified by physical address X'. The target memory device performs the desired write operation and informs the controller 42 that the write is complete.

Additionally, the physical address X' is decoded and cache policy information corresponding to the target memory device retrieved as previously described, e.g., by address decoder circuit 44 or 54. Alternatively, the target memory device provides its cache policy information to the memory controller 42. Regardless, the MMU 36 is notified that the write operation has completed. Further, the cache policy setting circuit 40 is provided the target memory device's cache policy information. In this example, the cache policy information indicates "allocate on read only." Thus, the write operation completes in the processor 14 and the MMU 36 does not allocate a cache line in one of the processor caches 26, 28, 30.

Figure 7:
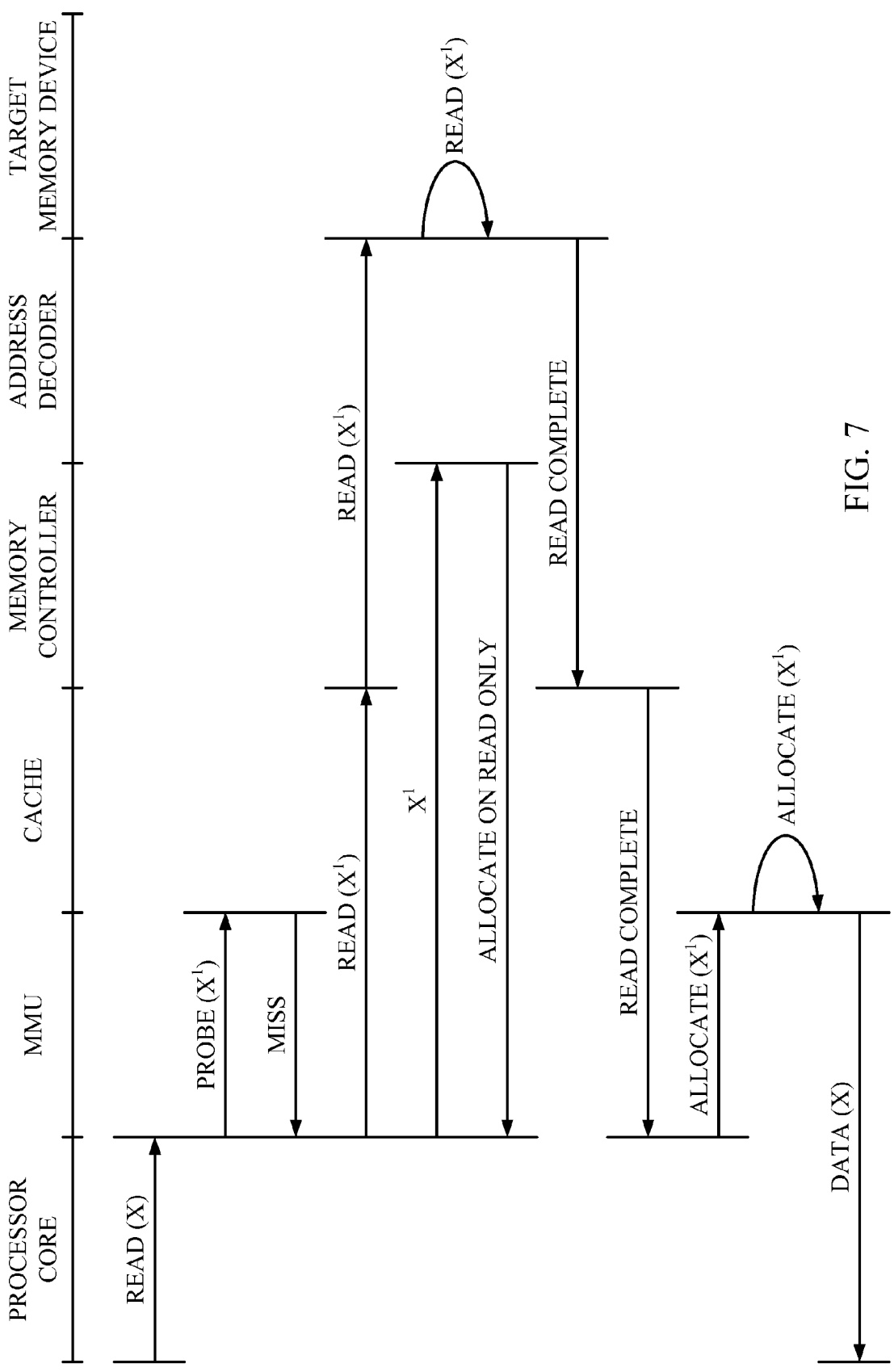
FIG. 7 is a diagram illustrating how the circuitry of FIG. 4 determines caching policies responsive to an exemplary read operation.

FIG. 7 continues the exemplary illustration by showing a subsequent read request issued by the processor core 24 to the same virtual address X. Recall, the target memory device's cache policy information indicates "allocate on read only" for the memory location identified by physical address X'. Therefore, no cache lines were previously allocated for physical address X'. As such, a cache miss occurs during the present read operation.

Further, when the target memory device completes the read operation, the read operation is not complete in the processor 14 because the target device's cache policy information indicates that a cache line should be allocated. Thus, the cache policy setting circuit 40 sets the current cache allocation policy such that the MMU 36 instructs one of the processor caches 26, 28, 30 to allocate a cache line for the physical address X'. Additionally, a cache level policy associated with the target memory device may indicate which level of cache should allocate a cache line, e.g., one of the first level caches 26, 28 or the L2 cache 30. Other cache policies may also be set based on the target device's cache policy information. Regardless, the corresponding data is also provided to the processor core 24 for processing.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of determining a cache policy, the method comprising:

receiving first cache policy information at a memory management unit within a processor, wherein the first cache policy information is received from an address decoder circuit based on a page table entry associated with a target memory device and wherein the processor is coupled to the target memory device via a memory controller;

storing the first cache policy information at the processor;

setting the cache policy based on second cache policy information received from the memory controller upon receipt at the memory controller of the second cache policy information from the target memory device; and wherein the first cache policy information and the second cache policy information are generated by the address decoder residing in the memory controller.

2. The method of claim 1, wherein the second cache policy information is stored in a device identification register of the target memory device.

3. The method of claim 1, further comprising overwriting the first cache policy information with the second cache policy information when the second cache policy information is available from the target memory device and setting the cache policy based on the second cache policy information.

4. The method of claim 1, wherein the cache policy includes an indication of which level of cache is to allocate a cache line in response to a memory operation directed at the target memory device.

5. The method of claim 1 further comprising setting the cache policy based on the first cache policy information when the second cache policy is not available from the target memory device.

6. A processor, comprising:
a cache configured to store information local to the processor;
a memory management unit inside the processor, the memory management unit configured to set a cache policy for the cache based on cache policy information associated with a target memory device in response to receiving the cache policy information from a memory controller that is external to the processor and coupled to the target memory device; and wherein the memory controller includes an address decoder that decodes physical addresses and causes a multiplexer to select the cache policy information associated with the target memory device.

7. The processor of claim 6, wherein the memory controller is configured to receive the cache policy information from the target memory device in response to a memory operation directed at the target memory device.

8. The processor of claim 6, wherein the memory management unit is further configured to:
receive alternate cache policy information from an address decoder circuit of the processor, wherein the alternate cache policy information is retrieved from a page table entry associated with the target memory device; and
set the cache policy based on the alternate cache policy information when the cache policy information is not available form the memory controller.

9. A system, comprising:
a processor;
a target memory device configured to store information used by the processor, wherein the target memory device is not a cache; and
a memory controller coupled to the processor and associated with the target memory device, the memory controller comprising an address decoder circuit,
wherein the processor comprises:
a cache configured to store information local to the processor;
a memory management unit configured to set a cache policy for the cache based on cache policy information associated with a target memory device when the cache policy information is available from the address decoder circuit; and wherein the memory controller includes the address decoder that decodes physical addresses, causing a multiplexer to select the cache policy information associated with the target memory device.

10. The system of claim 9, wherein the address decoder circuit of the memory controller comprises an address decoder and a table having an entry associated with the target memory device.

11. A method of determining cache policy, the method comprising:
retrieving first cache policy information associated with a target memory device;
storing the first cache policy information at a processor that is coupled to the target memory device via a memory controller;
when second cache policy information is available from the memory controller:
overwriting the stored first cache policy information with the second cache policy information; and
setting a cache policy based on the second cache policy information; and wherein an address decoder located in the memory controller decodes physical addresses, causing a multiplexer to select the second cache policy information associated with the target memory device.

12. The method of claim 11, wherein the memory controller receives the second cache policy from a device ID register of the target memory device.

13. The method of claim 11, wherein the cache policy includes an indication of which level of cache is to allocate a cache line in response to a memory operation directed at the target memory device.

14. The memory of claim 11, wherein the cache policy indicates allocate on read only.

15. The method of claim 11, wherein the memory controller includes an address decoder circuit, wherein the address decoder circuit comprises an address decoder and a table having an entry associated with the target memory device.

16. A processor comprising:
a cache configured to store information local to the processor; and
a memory management unit configured to:
store a first cache policy information at the processor, wherein the first cache policy information is received from a page table entry associated with a target memory device, wherein the target memory device is not a cache and wherein the page table entry is identified by an address associated with a memory access by the processor;
set a cache policy for the cache based on the first cache policy information; and
when second cache policy information is available from a memory controller associated with the target memory device:
overwrite the stored first cache policy information with the second cache policy information;
replace the cache policy with another cache policy based on the second cache policy information; and wherein the memory controller includes an address decoder that decodes physical addresses and generates a control signal that enables a multiplexer to select the second cache policy information.

17. The processor of claim 16, wherein the cache comprises a Level 2 (L2) cache.

18. A system comprising:
a target memory device;
a memory controller associated with the target memory device, the memory controller comprising an address decoder circuit; and
a processor coupled to the memory controller, the processor including:

a cache configured to store information local to the processor; and a memory management unit configured to:
- store first cache policy information at the processor, wherein the first cache policy information is received from a page table entry associated with the target memory device and wherein the page table entry is identified by an address associated with a memory access by the processor;
- set a cache policy for the cache based on the first cache policy information;
- when second cache policy information is available from the memory controller, overwrite the stored first cache policy information with the second cache policy information and set the cache policy based on the second cache policy information; and wherein the second cache policy information is provided by a multiplexer enabled by a control signal generated by the address decoder residing in the memory controller.

19. The system of claim 18, wherein the cache is an instruction cache.

20. The system of claim 18, wherein the cache is a data cache.

21. The system of claim 18, wherein the target memory device is a Synchronous Graphics Random Access Memory (SGRAM) device.

22. The system of claim 18, wherein the target memory device is a Synchronous Dynamic Random Access Memory (SDRAM) device.

23. The system of claim 18, wherein the cache policy includes an indication of which level of cache is to allocate a cache line in response to a memory operation directed at the target memory device.

* * * * *